Feb. 28, 1950  P. W. PUGH  2,498,927
TACHOMETER SWITCH
Filed April 25, 1945
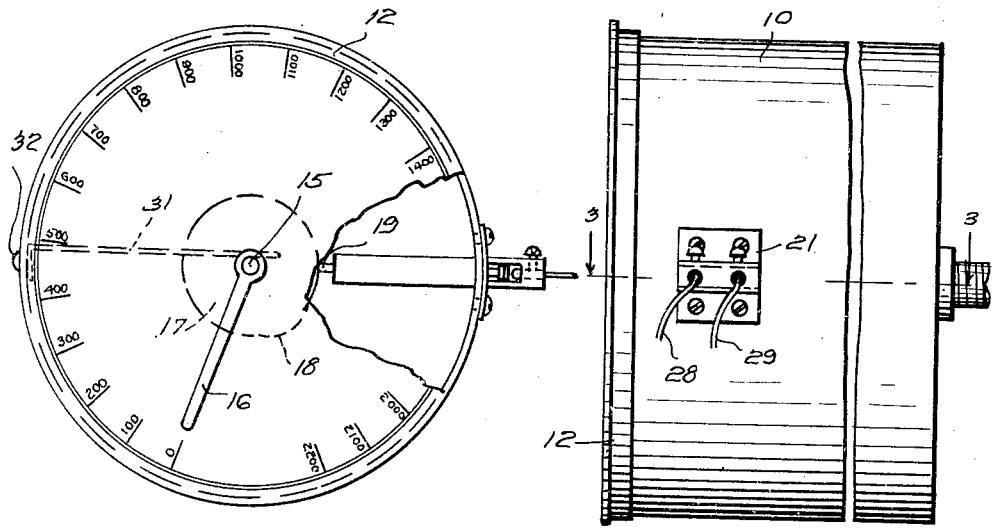
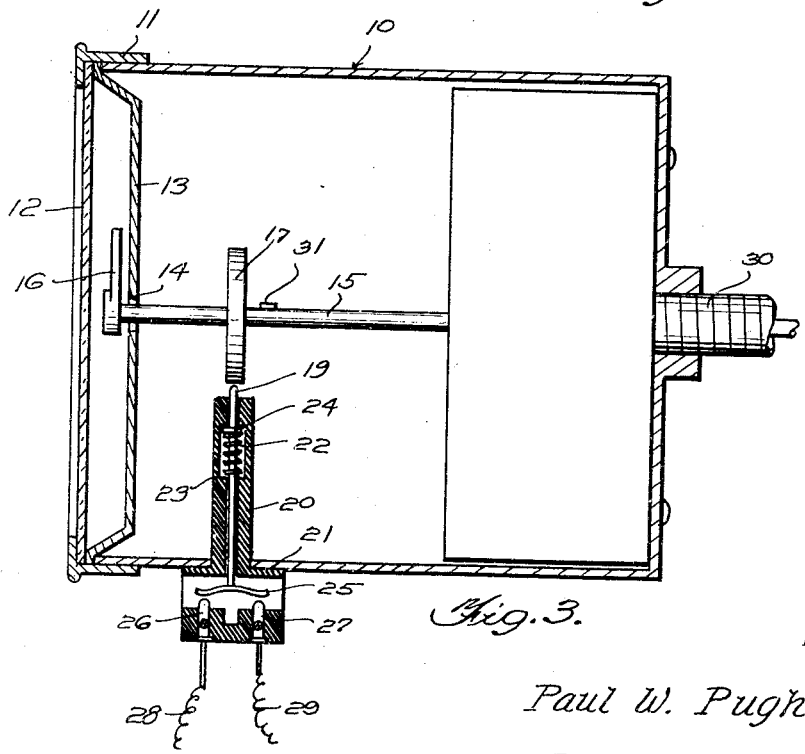
Inventor
Paul W. Pugh, Patented Feb. 28, 1950

2,498,927

UNITED STATES PATENT OFFICE 2,498,927

TACHOMETER SWITCH

Paul W. Pugh, Mission, Kans.

Application April 25, 1945, Serial No. 590,299

3 Claims. (Cl. 200—56)

This invention relates to a safety tachometer, and more particularly to such a device adapted to be utilized in conjunction with aircraft or other internal combustion engines using magnetos for ignition.

A primary object of the invention is the provision of an improved safety tachometer adapted to limit the revolutions per minute an engine can develop.

An additional object of the invention is the provision of such a device which, when the engine exceeds the maximum number of revolutions per minute for which the device is set, will automatically ground out the magneto, thus shorting the engine and temporarily cutting it off.

An additional object of this invention is the provision of such a device primarily adapted to be used in conjunction with aircraft engines under such circumstances as to preclude the use of a mechanical governor, as for example, with the centrifugal force exerted by the rotation of the shaft or whole installation would render a conventional governor inoperative.

As conducive to a clearer understanding of this invention, it may here be pointed out that in aircraft a propeller will occasionally break or will be thrown free of the propeller shaft. Under such circumstances, the engine immediately races and tears itself from its mounting, thus destroying the engine and the aircraft. A primary object of this invention, therefore, is to provide a device which, under such circumstances, will automatically cut off the engine as soon as the rotation of the propeller shaft has exceeded a predetermined number of revolutions per minute.

Other objects reside in the provision of such a device which will be sturdy and durable in construction, reliable and efficient in operation, and relatively simple and inexpensive to manufacture, assemble and install, and which may be readily applied to either a conventional tachometer or utilized as a separate instrument, as may be desired.

Other objects reside in the combinations of elements, arrangements of parts, and features of construction, all as will be more fully pointed out hereinafter and disclosed in the accompanying drawing, wherein there is shown a preferred embodiment of this inventive concept.

In the drawing:

Figure 1 is a front elevational view of one form of device embodying the instant inventive concept, certain parts thereof being broken away.

Figure 2 is a side elevational view of the device disclosed in Figure 1.

Figure 3 is an enlarged sectional view taken substantially along the line 3—3 of Figure 2.

Similar reference characters refer to similar parts throughout the several views of the drawing.

Having reference now to the drawing, there is generally indicated at 10 a casing provided with a closure member 11 adapted to secure in position a transparent plate 12 of glass or the like. Positioned rearwardly of the plate 12 is a dial 13 provided with indicia for the purpose of recording the revolutions per minute of the propeller shaft, or similar device. The plate 13 is provided with an aperture 14, through which extends one end of an indicator shaft 15, upon which is mounted a pointer 16 adapted to designate the appropriate indicia for the number of revolutions per minute.

Mounted within the casing 10 on the shaft 15 back of the plate 13 is a cam member 17 provided with a protuberance 18, as best shown in Figure 1, so positioned that when a predetermined speed in revolutions per minute is reached, the protuberance is juxtaposed to an actuating rod 19. The actuating rod 19 is mounted in a sleeve 20 of insulating material, which extends through the wall of the casing 10 and terminates in a flange 21. Positioned within sleeve 20 is a recess 22, within which is seated a compression spring 23 adapted to engage with a flange 24 carried by the rod 19, and normally biasing the same toward the cam 17. The opposite end of the rod 19 extends to a contact member 25 positioned for engagement with contacts 26 and 27, from which wires 28 and 29, respectively, lead to the magnetos of the motor.

The tachometer shaft 15 extends into the casing 10 through a suitable insulating bushing 30 and a grounding spring 31 (see Fig. 1) normally in engagement with the shaft 15 is secured, as by means of a screw 32, to the side wall of the casing 10.

From the foregoing, the operation of the device should now be readily understandable. Assuming, for example, that the normal speed of maximum rotation of the engine with which the tachometer is associated is 2,000 revolutions per minute, it will be seen that the indicator needle 16 may rotate until the indicia designating 2,000 R. P. M. is reached without affecting the position of the rod 19 and its associated contact member 25. However, when the speed is exceeded, even momentarily, such as would substantially instantaneously occur in the event that the propeller was broken or thrown from the shaft, the protuberance 18 would immediately contact the end of the actuating rod 19 and force the contact member 25 into engagement with contacts 26 and 27. Immediately a circuit would be established through the shaft 15 to the grounding spring 31, thus grounding out the magnetos and causing the engine to slow down substantially immediately. As the tachometer needle dropped back below the 2,000 R. P. M. mark, the grounding circuit would be broken, but in the interim the pilot would have ample opportunity to throw the main ignition switch, cutting off the motor, and thus precluding the tearing loose of the engine and consequent destruction of the plane.

In the foregoing, the device has been described as particularly applicable to aircraft engines, and it will be readily understood that the same may be utilized in any desired installation wherein the rotating speed of a shaft is desired to be limited to a predetermined number of revolutions per minute.

From the foregoing, it will now be seen that there is herein provided a device accomplishing all the objects of this inventive concept, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a device of the character described for use in connection with an electric circuit, a tachometer shaft, a cam carried thereby, a grounding contact in engaged relation with said shaft, an operating rod adjacent said cam, a contact adjacent the other end of said rod, said contact being in the said electrical circuit and means normally biasing said rod away from said contact until engaged therewith by said cam.

2. In a device of the character described for use in connection with an electrical circuit, a casing, a tachometer shaft in said casing, a cam carried by said shaft, a grounding contact secured to said casing, and abutting said shaft, an operating rod adjacent said cam, an insulated sleeve extending through said casing surrounding said operating rod, a contact adjacent the other end of said rod exteriorly of the said casing, said contact being in the circuit, and means normally biasing said rod away from said contact until engaged therewith by said cam.

3. In a device of the character described for use in connection with an electrical circuit, a casing, a tachometer shaft in said casing, a cam carried by said shaft, a grounding contact secured to said casing, and abutting said shaft, an operating rod adjacent said cam, an insulated sleeve extending through said casing surrounding said operating rod, a contact adjacent the other end of said rod exteriorly of the casing, said contact being in the said electrical circuit, and means normally biasing said rod away from said contact until engaged therewith by said cam, said last-mentioned means comprising a spring positioned in a recess in said sleeve.

PAUL W. PUGH.

REFERENCES CITED

The following references are of record in the file of this patent:

UNITED STATES PATENTS

| Number | Name | Date |
|---|---|---|
| 977,703 | Brown | Dec. 6, 1910 |
| 1,138,560 | Helfer | May 4, 1915 |
| 1,238,066 | Mullen | Aug. 21, 1917 |
| 1,323,801 | Werner | Dec. 2, 1919 |
| 1,538,009 | Slaight | May 19, 1925 |
| 1,590,404 | Allen | June 19, 1926 |
| 1,962,999 | Owens | June 12, 1934 |
| 1,999,313 | Alexonis | Apr. 30, 1935 |
| 2,289,643 | Furnas et al. | July 14, 1942 |
| 2,398,007 | Hunter | Apr. 9, 1946 |
| 2,433,895 | Fairhurst | Jan. 6, 1948 |

FOREIGN PATENTS

| Number | Country | Date |
|---|---|---|
| 23,093 | Great Britain | Oct. 26, 1903 |
| 151,199 | Great Britain | Sept. 23, 1920 |
| 455,657 | Germany | Feb. 7, 1928 |